United States Patent
Thompson et al.

(10) Patent No.: US 6,202,059 B1
(45) Date of Patent: Mar. 13, 2001

(54) METHOD AND APPARATUS FOR SELECTING A WIRELESS COMMUNICATION SITE

(75) Inventors: Michael J. Thompson; Stanko Jelavic, both of Davie, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/253,996

(22) Filed: Jun. 3, 1994

(51) Int. Cl.[7] ................................................. G06F 15/18
(52) U.S. Cl. ................................................. 706/46; 706/54
(58) Field of Search ....................... 395/51, 900; 379/60, 379/58, 62; 455/33.1, 67.7; 706/45, 54

(56) References Cited

U.S. PATENT DOCUMENTS

| | | | |
|---|---|---|---|
| 4,969,180 | * | 11/1990 | Watterson et al. ............. 379/58 |
| 5,239,684 | * | 8/1993 | Ishikura ...................... 455/67.7 |
| 5,276,905 | * | 1/1994 | Hurst et al. .................. 455/33.1 |
| 5,432,842 | * | 7/1995 | Kinoshita et al. ............. 379/60 |
| 5,488,649 | * | 1/1996 | Schellinger .................. 379/62 |
| 5,519,884 | * | 5/1996 | Duque-Anton et al. ........ 455/33.1 |

OTHER PUBLICATIONS

Edwards et al., A new hand–off algorithm using fuzzy logic, Proceedings of the 1994 IEEE SOUTHEASTCON 94, pp. 89–92, Apr. 13, 1994.*

A new hand–off algorithm using fuzzy logic by G. Edwards and R. Sankar, pp. 89–92, Apr. 13, 1994.*

* cited by examiner

*Primary Examiner*—Hosain T. Alam
*Assistant Examiner*—Sanjiv Shah
(74) *Attorney, Agent, or Firm*—Andrew S. Fuller (57) ABSTRACT

A communication device (104) is provided which incorporates a hovel method for selecting a preferred communication site from available communication sites (110, 120, 130) within a wireless communication system (100). The communication device (104) receives a communication signal from at least two of the available communication sites (110, 2120, 130). A preferred communication site (420) is selected using fuzzy logic based in part on the received communication signal (216).

9 Claims, 7 Drawing Sheets

METHOD AND APPARATUS FOR SELECTING A WIRELESS COMMUNICATION SITE

TECHNICAL FIELD

This invention relates in general to radio communication systems, and in particular, to communication site selection within a radio communication system.

BACKGROUND

A wireless communication system typically includes portable communication units such as two-way radios, wireless terminals and computers, radio telephones, and the like. When operating over a wide geographical area, a wireless communications system is often organized into geographically based subregions for proper management of the system. Each subregion is served by a communication site which serves to manage, route, or enhance communication signals within the system. As the portable communication unit travels between regions, it may be necessary for a control or management function to be transferred among communication sites. In some systems, coordination occurs among sites to determine the site best suited to handle a particular communication unit. In other systems, the site selection function is manually or automatically performed at each communication unit. When such site selection is automatically performed at an individual communication unit, the resulting implementation logic can be quite complex.

A parameter often used in the site selection decision is the signal strength between the communication unit and the communication site. The signal strength may be measured from signals emitted from a communication unit or from a communication site. User preference, priority, site utilization, and other such parameters, may also contribute to the decision making process. Prior art methods for combining these parameters to determine a preferred communication site are generally complex in terms of implementation and execution. Such complexity requires substantial processing and storage resources at the communication unit to exploit these solutions.

It is desirable to provide automated communication site selection as a feature within a communication unit operating in a segmented wireless communication system. Preferably, the site selection feature should not be overly burdensome on the overall operation of the communication unit. Accordingly, such site selection must be provided in a manner which improves flexibility and efficiency, while reducing resource consumption and the associated costs at the communication unit. Therefore, an improved communication site selection scheme is needed.

DETAILED DESCRIPTION OF THE PREFERRED EMBODIMENTS

Figure 1:
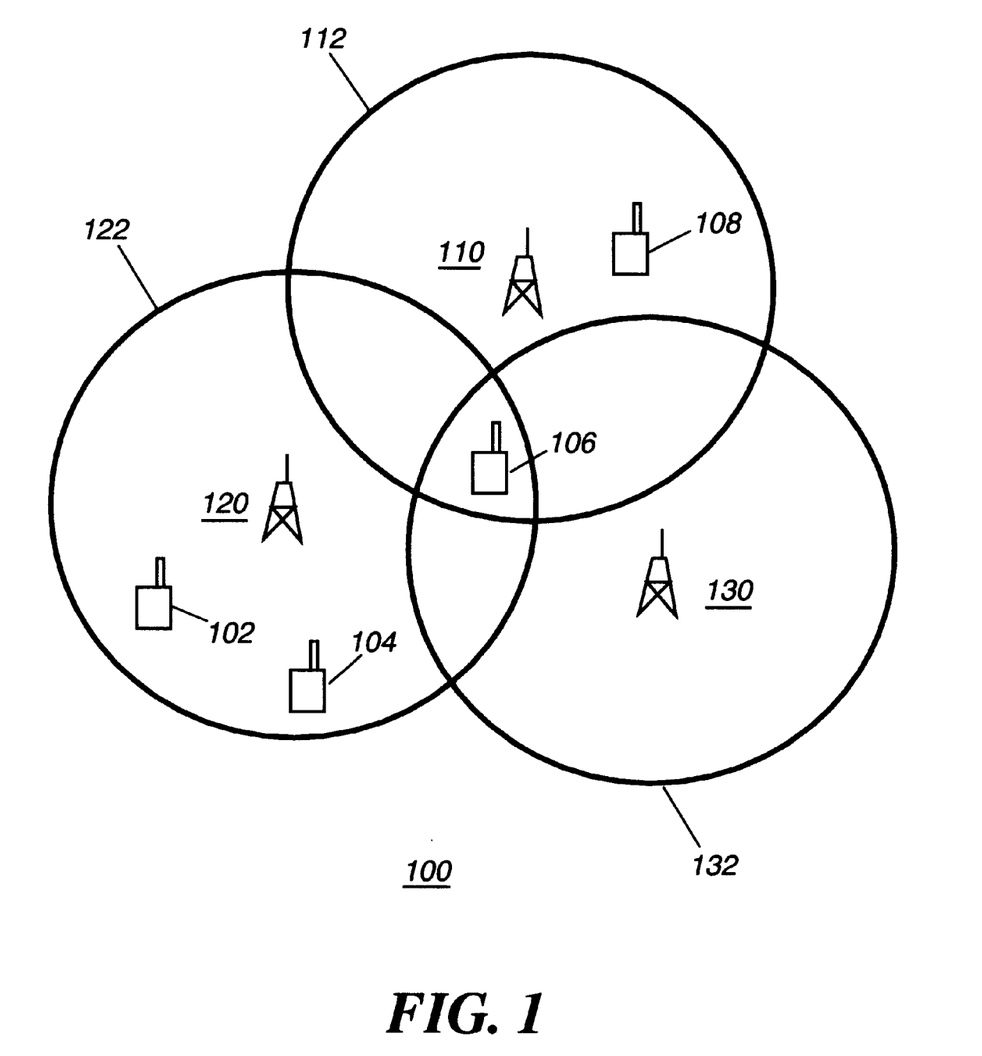
FIG. 1 is a simplified representation of a wide area wireless communication system, in accordance with the present invention.

Referring to FIG. 1, a wide area wireless communication system 100 is shown, in accordance with the present invention. The communication system 100 includes portable or mobile wireless communication devices, such as two-way radios 102, 104, 106, 108, and multiple communication sites 110, 120, 130. Each communication site 110, 120, 130 serves to manage, route, or enhance communication signals within a geographic subregion 112, 122, 132. In the preferred embodiment, the sites 110, 120, 130 are repeater antenna facilities organized to provide a trunked system to support radio communication. Additionally, the sites 110, 120, 130 are accessed by the radio 102, 104, 106, 108 on different communication channels, such as radio frequency channels. The number and location of communication sites 110, 120, 130 define the coverage area of the communication system 100. Each radio 102, 104, 106, 108 within the system selects a home site within communication range and communicates through that home site. There may also be an indicated home site preference which is considered in the site selection process. Thus, as the radio 102, 104, 106, 108 travels over the coverage area, different home sites 110, 120, 130 may be chosen.

Figure 2:
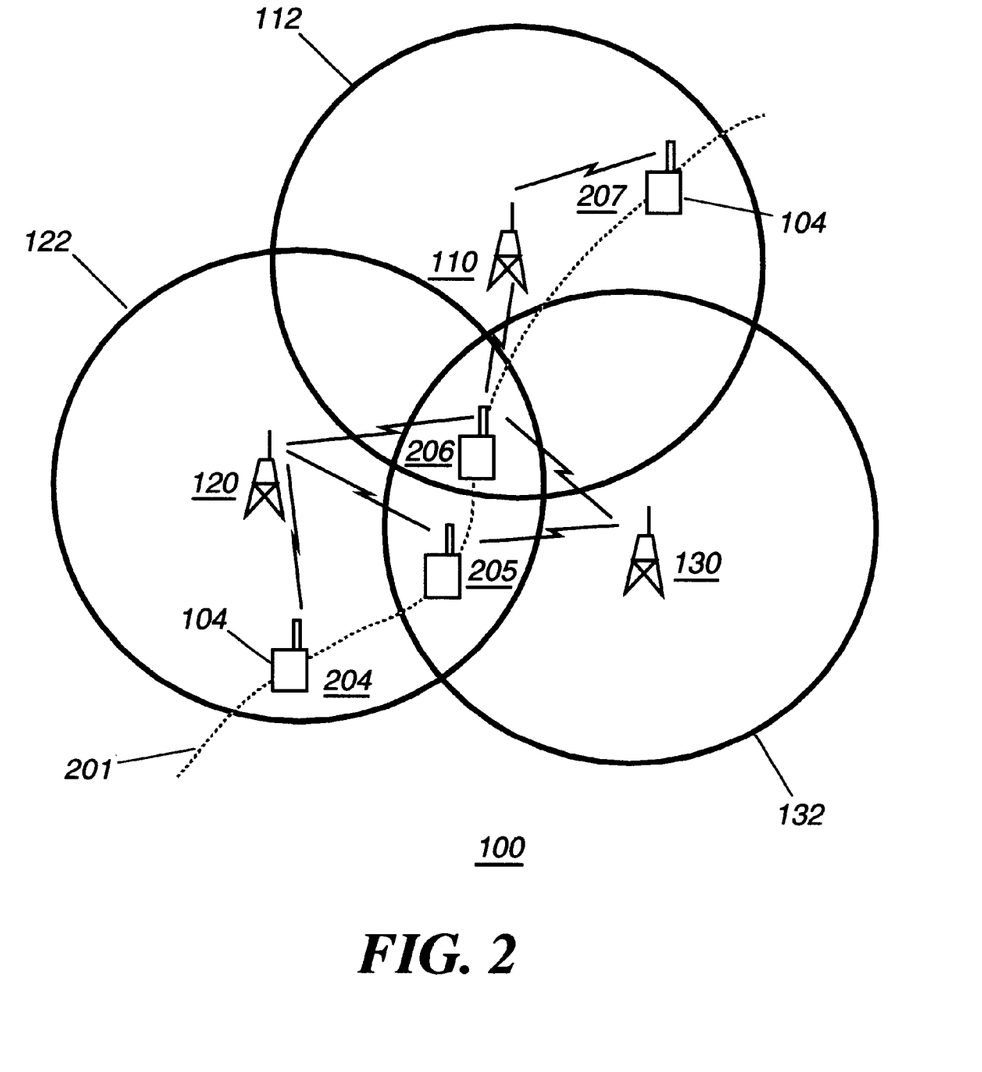
FIG. 2 is a simplified diagram showing site selection considerations of a radio traveling over the coverage area of the wide area communication system of FIG. 1.

FIG. 2 shows a radio 104 traveling along a path 201 through various subregions 112, 122, 132 of the coverage area of the wide area communication system 100. In the present invention, the radio 104 includes an automatic multiple site switching (AMSS) feature to automatically select home sites as it travels over the coverage area. The AMSS is based at least on part on the strength of communication signals received from a site and preselected site preferences defined for the radio 104. The received signal strength is measured on the communication channel corresponding to a communication site. Site preferences are programmed into the radio 104 and vary among the sites. Additionally, the strength of communication signals between the radio 104 and the sites vary as the radio 104 travels along the path 201 between various locations 204, 205, 206, 207. The radio 104 incorporates a fuzzy deduction system (see below) to determine appropriate home sites selected from among the available sites. Site preferences and signal strengths are weighted in a smooth fashion by the fuzzy deduction system to select the preferred home site.

Figure 3:
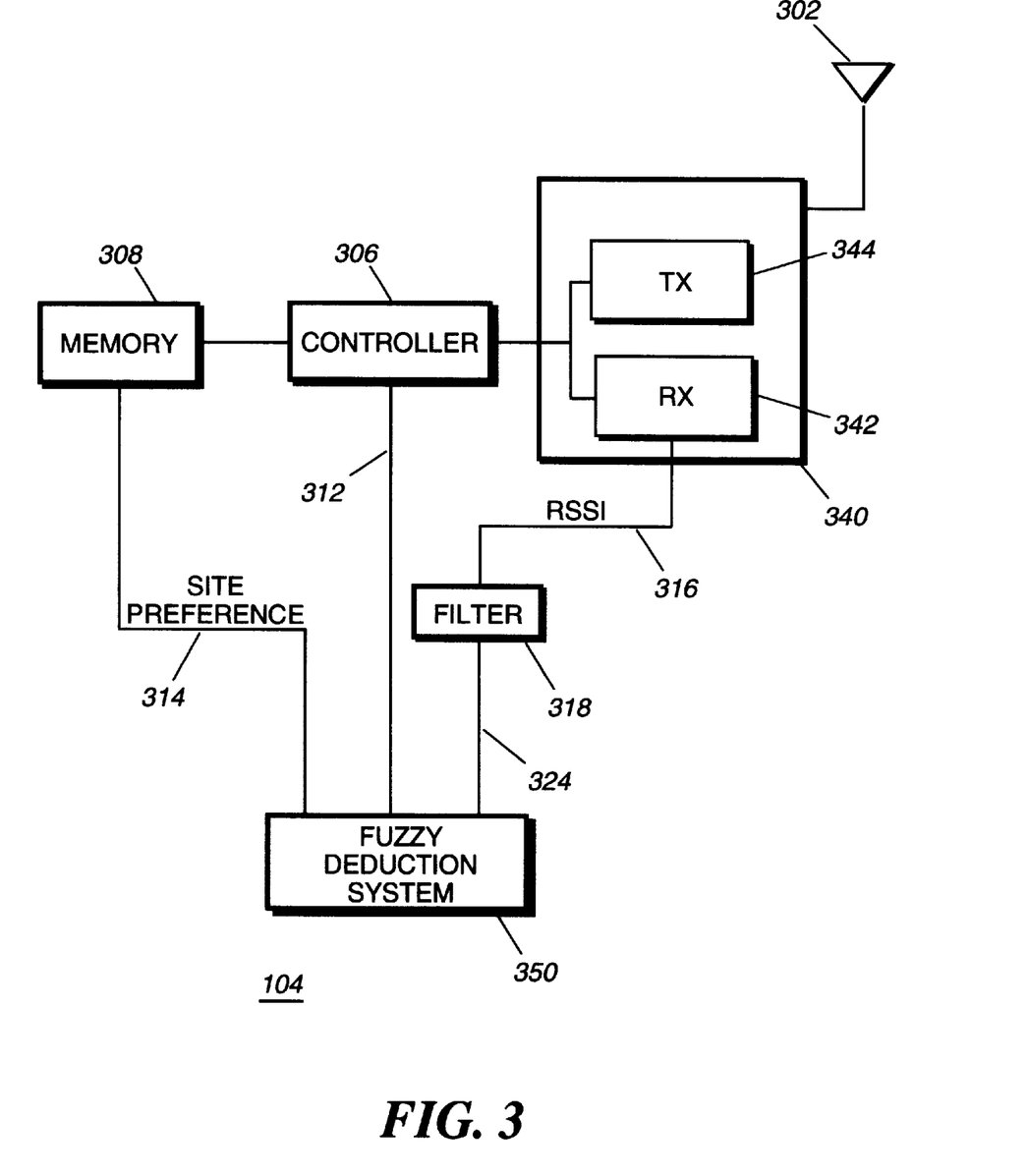
FIG. 3 is a block diagram of a radio, in accordance with the present invention.

Referring to FIG. 3, a block diagram of the radio 104 is shown, in accordance with the present invention. The radio 104 is capable of receive and transmit operations using well known principles. The radio includes a control 306, memory 308, a radio frequency (RF) portion 340, and fuzzy deduction system 350. The controller 306 uses logic and other information from the electrically coupled memory 308 to control the overall operation of the radio 104. The controller 306 is electrically coupled to the RF portion 340 which includes a receiver 342 and a transmitter 344. The RF portion 340 is electrically coupled to an antenna 302. For receive operations, communication signals are received by the antenna 302 and are selectively processed by the receiver 342. Similarly, for transmit operations, communication signals are processed by the transceiver 344 and radiated through the antenna 302. The memory 308 and RF portion 340 operate under the control of the controller 306.

The fuzzy deduction system 350 cooperates with the controller 306 to provide the AMSS feature of the present invention, by automatically switching communication channels as needed. As indicated earlier, received signal strength and preselected site preferences are combined to help determine a preferred home site. The fuzzy deduction system 350 performs the task of selecting a preferred site for use as a home site. The fuzzy deduction system 350 includes a device or combination of devices which can perform fuzzy deduction, fuzzy comparisons, and fuzzy arithmetic operations, or any such combination or similar function. Fuzzy devices may be digital or analog, and may be implemented using hardware, software, or a combination of both. In the preferred embodiment, the fuzzy deduction system includes a fuzzy processor. The fuzzy deduction system 350 receives, as input, a filtered received signal strength indicator (RSSI) 316, derived from the receiver 342, for each site available for communications, and a site preference indicator (SPI) 314 for the respective site. The received signal strength is obtained via communication circuitry within the receiver 342, and is filtered by a filter 318 to provide a filtered signal 324 as input to the fuzzy deduction system 350. The output 312 of the fuzzy deduction system 350 indicates whether the controller 306 should switch to a new communication channel corresponding to a new home site.

Figure 4:
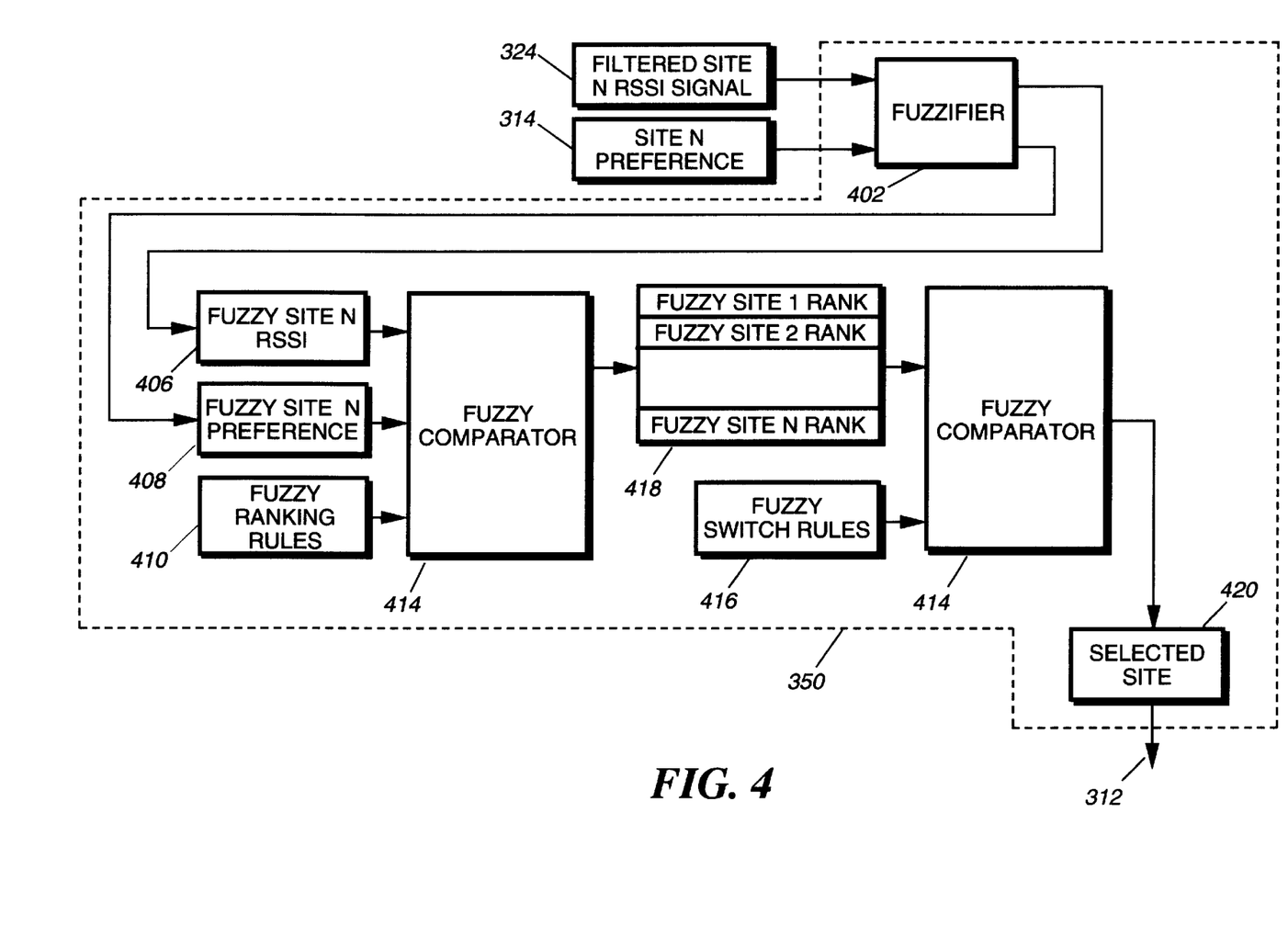
FIG. 4 is a block diagram showing details of a fuzzy deduction system, in accordance with the present invention.

FIG. 4 is a block diagram showing additional details of the fuzzy deduction system 350. The RSSI and SPI inputs 324, 314 are fed into a fuzzifier 402 for processing. The fuzzifier 402 provides fuzzy values 406, 408 for both the RSSI and SPI. The fuzzifier 402 is explained in more detail below. The fuzzy value 406 for a site's RSSI, and the fuzzy value 408 for the site's SPI, are processed against a set of fuzzy ranking rules 410 by a fuzzy comparator 414 to arrive at a set of fuzzy site ranks 418. The fuzzy site ranks 418 are then processed against a set of fuzzy switch rules 416 by the fuzzy comparator 414 to produce preferred home site. In the preferred embodiment, the fuzzy switch rules 416 are simplified by forming pairs of site ranks, and by comparing the differences between site ranks. This process will be further described below.

Figure 5:
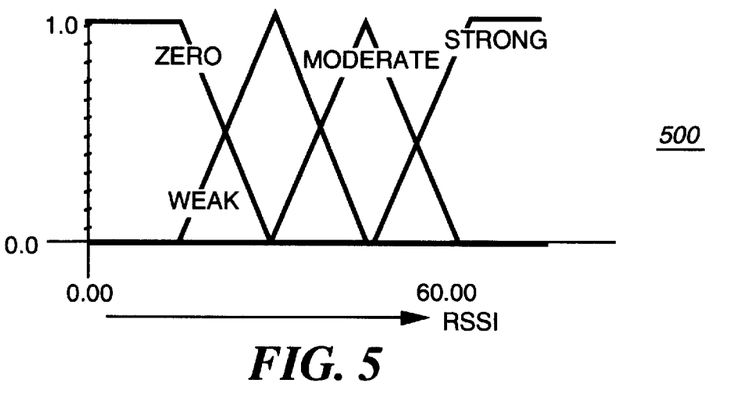
FIG. 5 is a graph of fuzzy membership functions relating to the received signal strength of communication signals received from a site, in accordance with the present invention.

The fuzzy deduction system 350 is also defined by sets of fuzzy adjectives which form basis elements, or membership functions, for RSSI, SPI, site ranks, and for delta site ranks. All inputs have degrees of membership in each adjective of the fuzzy set. The fuzzifier 402 determines fuzzy set membership based on input value, and assigns degrees of membership for each adjective within the fuzzy set. For the RSSI, the fuzzy adjectives are defined as STRONG, MODERATE, WEAK, and ZERO. Thus, a fuzzy logic set is formed having basis elements based on degrees of signal strength. A graphical representation 500 of the fuzzy set for RSSI is shown in FIG. 5. Depending of the filtered value of the RSSI (between 0 and 60), the fuzzifier 402 may assign a fuzzy value that may have components of STRONG, MODERATE, WEAK, and ZERO. For example, a filtered value of 40 may result in a fuzzy value having a large component of STRONG, a smaller component of MODERATE, and very small components of WEAK and ZERO.

Figure 6:
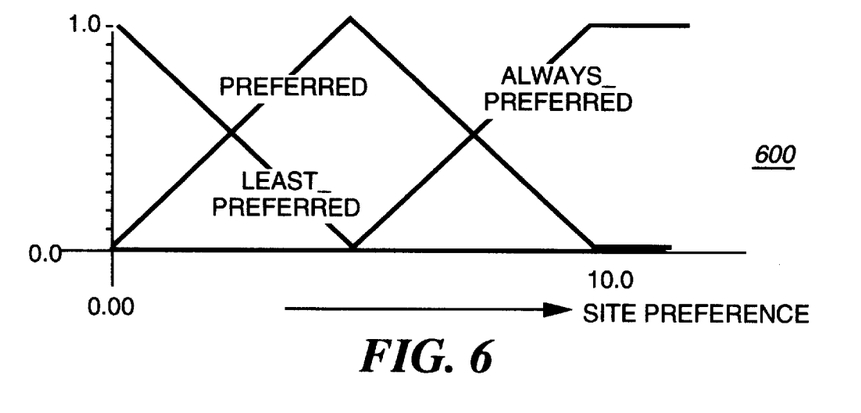
FIG. 6 is a graph of fuzzy membership functions relating to site preference, in accordance with the present invention.

The SPI is a site preference rating for each available communication site which is preselected and programmed into the radio. The SPI fuzzy adjectives are defined as PREFERRED, ALWAYS_PREFERRED, and LEAST_PREFERRED. Thus, a fuzzy logic set is formed having basis elements based on degrees of home site preference. A graphical representation 600 of the fuzzy set for site preference is shown in FIG. 6. Potential input values ranging from 0 to 10.0 allow for a wide variation of preference with components appropriated from adjectives of the set.

Figure 7:
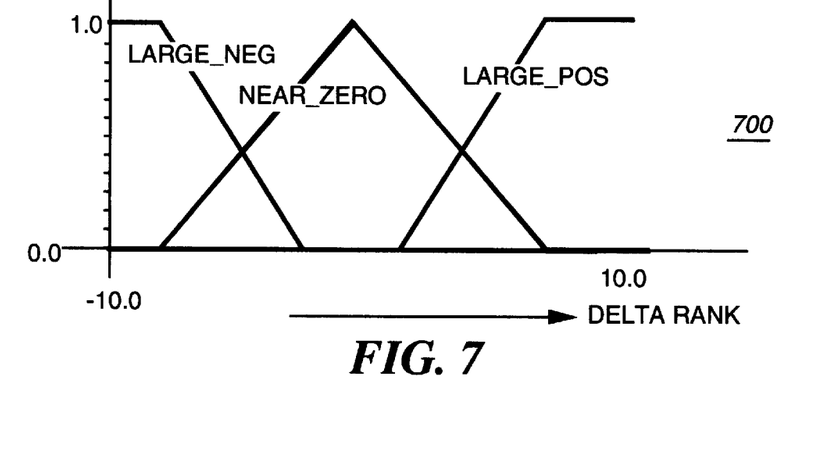
FIG. 7 is a graph of fuzzy membership functions relating to the difference in site ranking, in accordance with the present invention.

Site ranks and delta site ranks are interim values used in the fuzzy deduction system 350. Recall that site ranks are generated from fuzzy ranking rules applied to a combination of fuzzy input values for RSSI and SPI. The fuzzy adjectives for site ranks are defined as HIGH, MEDIUM, LOW, and ZERO. A delta site rank is calculated for each pair of sites in the communication system 100 from the difference in rank value. The fuzzy adjectives for delta site rank are defined as LARGE_NEGATIVE, NEAR_ZERO, and LARGE_POSITIVE. Thus, a fuzzy logic set is formed having basis elements based on difference in site ranks. A graphical representation 700 of the fuzzy set for delta site rank is shown in FIG. 7. Combinations of LARGE_NEGATIVE, NEAR_ZERO, and LARGE_POSITIVE define the differences in site ranks.

Figure 8:
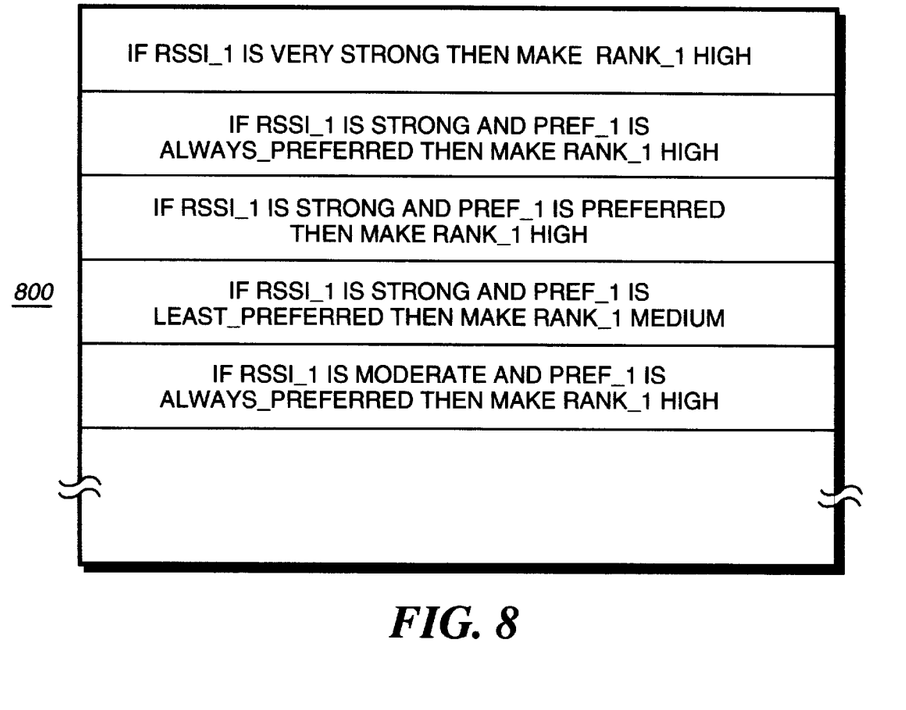
FIG. 8 is a partial set of fuzzy rules governing site ranking, in accordance with the present invention.

Referring to FIG. 8, a partial set of fuzzy rules 800 governing site ranking is shown, in accordance with the present invention. The fuzzy comparator 314 executes these rules against the fuzzy input set for RSSI and SPI. Examples of the rules follow:

(1) if RSSI for site 1 is very STRONG then make rank for site 1 HIGH;

(2) if RSSI for site 1 is STRONG and SPI for site 1 is ALWAYS_PREFERRED then make rank for site 1 HIGH;

(3) if RSSI for site 1 is STRONG and SPI for site 1 is PREFERRED then make rank for site 1 HIGH;

(4) if RSSI for site 1 is STRONG and SPI for site 1 is LEAST_PREFERRED then make rank for site 1 MEDIUM;

(5) and so on.

Figure 9:
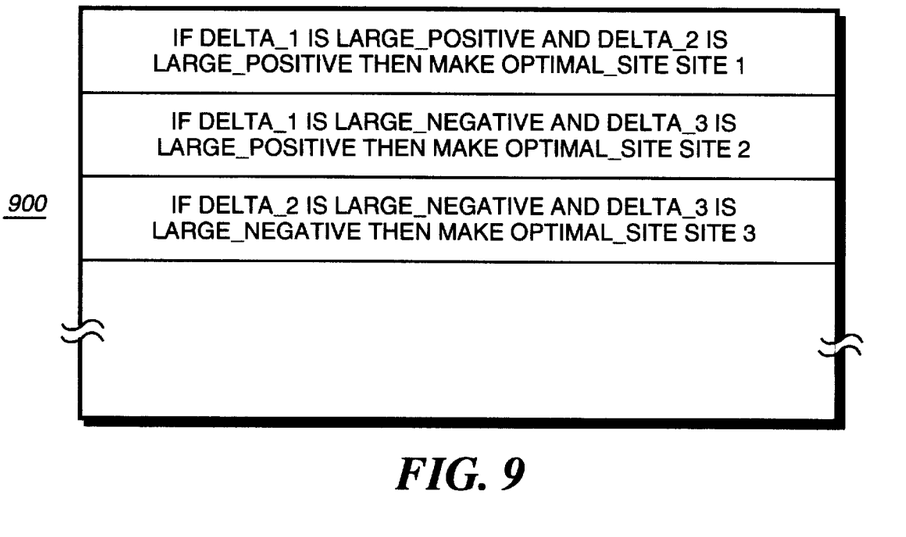
FIG. 9 is a partial set of fuzzy rules governing site selection based on the difference in site ranking, in accordance with present invention.
Figure 10:
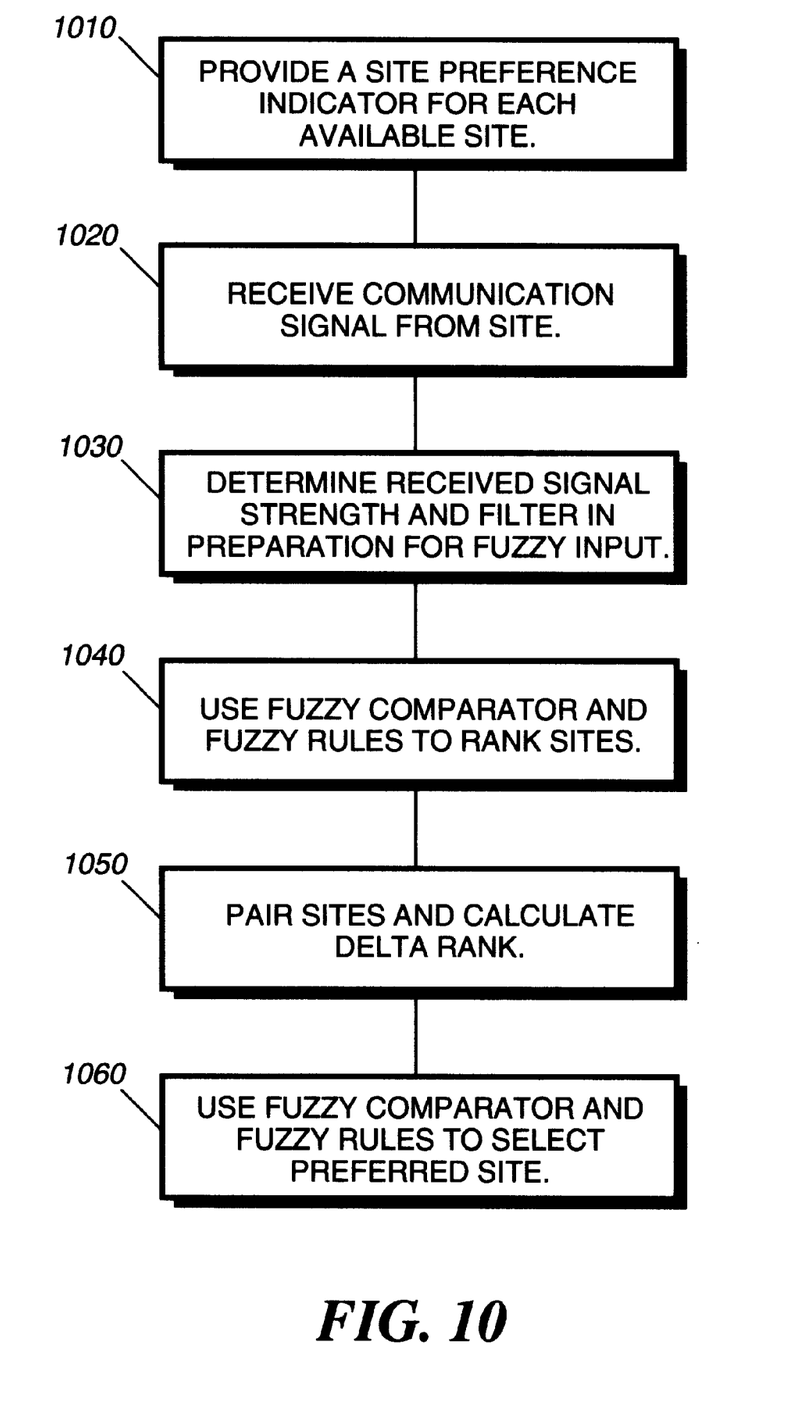
FIG. 10 is a flowchart of procedures used to select a preferred home site, in accordance with the present invention.

Referring to FIG. 9, a partial set of fuzzy rules 900 governing site selection is shown, in accordance with the present invention. The rules are based on delta site ranks which are calculated from the differences of pairs of site ranks. For example, delta 1=rank of site 1−rank of site 2;

delta 2=rank of site 1−rank of site 3; delta 3=rank of site 2−rank of site 3, etc. The fuzzy comparator 314 executes these rules against pairs of site ranks. The selected home site is defuzzified and presented in discrete format. Examples of the rules follow:

(1) if delta 1 is LARGE_POSITIVE and delta 2 is LARGE_POSITIVE then choose site 1 as the preferred home site;

(2) if delta 2 is LARGE_NEGATIVE and delta 2 is LARGE_POSITIVE then choose site 2 as the preferred home site;

(3) if delta 1 is LARGE_NEGATIVE and delta 3 is LARGE_NEGATIVE then choose site 3 as the preferred home site;

Referring to FIG. 10, a summary of procedures to select a preferred home site is shown, in accordance with the present invention. A preference rating for each available communication site is obtained and fed into the fuzzy deduction system, step 1010. The received signal strength is measured for each available communication site, step 1020. The received signal strength is then filtered and fed into the fuzzy deduction system, step 1030. Each site is ranked by a fuzzy rule system according to RSSI and site preference, step 1040. The sites are paired and a delta rank calculated for each pair, step 1050. The preferred home site is selected by a fuzzy rules based on the delta site rankings, step 1060. The fuzzy deduction system operates to find a site which is significantly better than other available sites. If there is no such site, then no preferred home site is reported by the fuzzy deduction system. If there is a preferred home site which is different than the current home site, the fuzzy deduction system reports it and the radio will automatically switch to this preferred home site.

The present invention offers significant advantages over prior art solutions. By employing a fuzzy deduction system to select a preferred home site, the complexity of implementing an automatic multiple site switching system is substantially reduced. Consequently, the time needed to develop new logic or to modify existing logic is decreased, thus allowing for a faster development time. The present invention also provides for a solution which consumes less computing, memory, and other radio resources in the home site determination process when compared to microprocessor intensive implementations using boolean logic often found in the prior art. The reduction in amount of radio resources used results in a reduction in power consumption required for the radio. Energy efficient solutions are paramount in todays radio environment. Thus, utilizing the present invention, a radio having a simpler design with lower power consumption can be produced.

What is claimed is:

1. A method for selecting from among a plurality of communication sites a preferred communication site for communicating in a wireless communication system, the method comprising the steps of:

providing a site preference indicator for each of the plurality of communication sites;

receiving a communication signal from at least two of the plurality of communication sites;

determining a received signal strength for each communication signal received; and selecting a preferred communication site using fuzzy logic based in part on the site preference indicator for each of the plurality of communication sites, and the received signal strength of each communication signal received.

2. The method of claim 1, wherein the step of selecting a preferred communication site using fuzzy logic based in part on the site preference indicator for each of the plurality of communication sites, and the received signal strength of each communication signal received, comprises the step of ranking the plurality of communication sites based in part on fuzzy inputs of received signal strength and site preference according to a set of fuzzy rules.

3. The method of claim 2, wherein the step of selecting a preferred communication site using fuzzy logic based in part on the site preference indicator for each of the plurality of communication sites, and the received signal strength of each communication signal received, comprises the steps of:

forming a delta rank fuzzy input set having basis elements based on a difference in ranking between ranked communication sites; and selecting a preferred communication site based on the delta rank fuzzy input set.

4. The method of claim 2, wherein the step of ranking the plurality of communication sites based in part on fuzzy inputs of received signal strength and site preference according to a set of fuzzy rules, comprises the step of forming a site preference fuzzy logic set having basis elements having degrees of preference.

5. The method of claim 2, wherein the step of ranking the plurality of communication sites based in part on fuzzy inputs of received signal strength and site preference indicators according to a set of fuzzy rules, comprises the step of forming a received signal strength fuzzy logic set having basis elements having degrees of signal strength.

6. A method for selecting from among a plurality of communication sites a preferred communication site for communicating in a wireless communication system, the method comprising the steps of:

providing a site preference indicator for each of the plurality of communication sites;

receiving a communication signal from at least two of the plurality of communication sites;

determining a received signal strength for each communication signal received; and selecting a preferred communication site using fuzzy logic based in part on the site preference indicator for each of the plurality of communication sites, and the received signal strength of each communication signal received, comprising the steps:

forming a site preference fuzzy logic set having basis elements having degrees of preference;

forming a received signal strength fuzzy logic set having basis elements having degrees of signal strength;

forming fuzzy inputs of received signal strength and site preference based on the site preference fuzzy logic set and the received signal strength fuzzy logic set; and ranking the plurality of communication sites based in part on fuzzy inputs of received signal strength and site preference according to a set of fuzzy rules.

7. The method of claim 6, wherein the step of selecting a preferred communication site using fuzzy logic based in part on the site preference indicator for each of the plurality of communication sites, and the received signal strength of each communication signal received, further comprises the steps of:

forming a delta rank fuzzy input set having basis elements based on the difference in ranking between ranked communication sites; and selecting a preferred communication site based on the delta rank fuzzy input set.

8. In a wireless communication system wherein a preferred communication site is selected from among a plurality of communication sites, a radio comprising:

means for receiving a communication signal from at least two of the plurality of communication sites;

means for determining a received signal strength for each communication signal received; and means for selecting a preferred communication site using fuzzy logic based in part on the received signal strength of each communication signal received, and based in part on a site preference indicator.

9. A communication device for communicating in a wireless communication system through a preferred communication site selected from among a plurality of communication sites, the communication device comprising:

a receiver to communicate over a wireless channel;

a site signal strength signal derived from the receiver; and a fuzzy deduction system electrically coupled to the communication circuitry, the fuzzy deduction system incorporating fuzzy logic based at least in part on site signal strength comparisons to select a preferred communication site from among the plurality of communication sites, and based at least in part on a site preference indicator.

* * * * *